Figure 1:
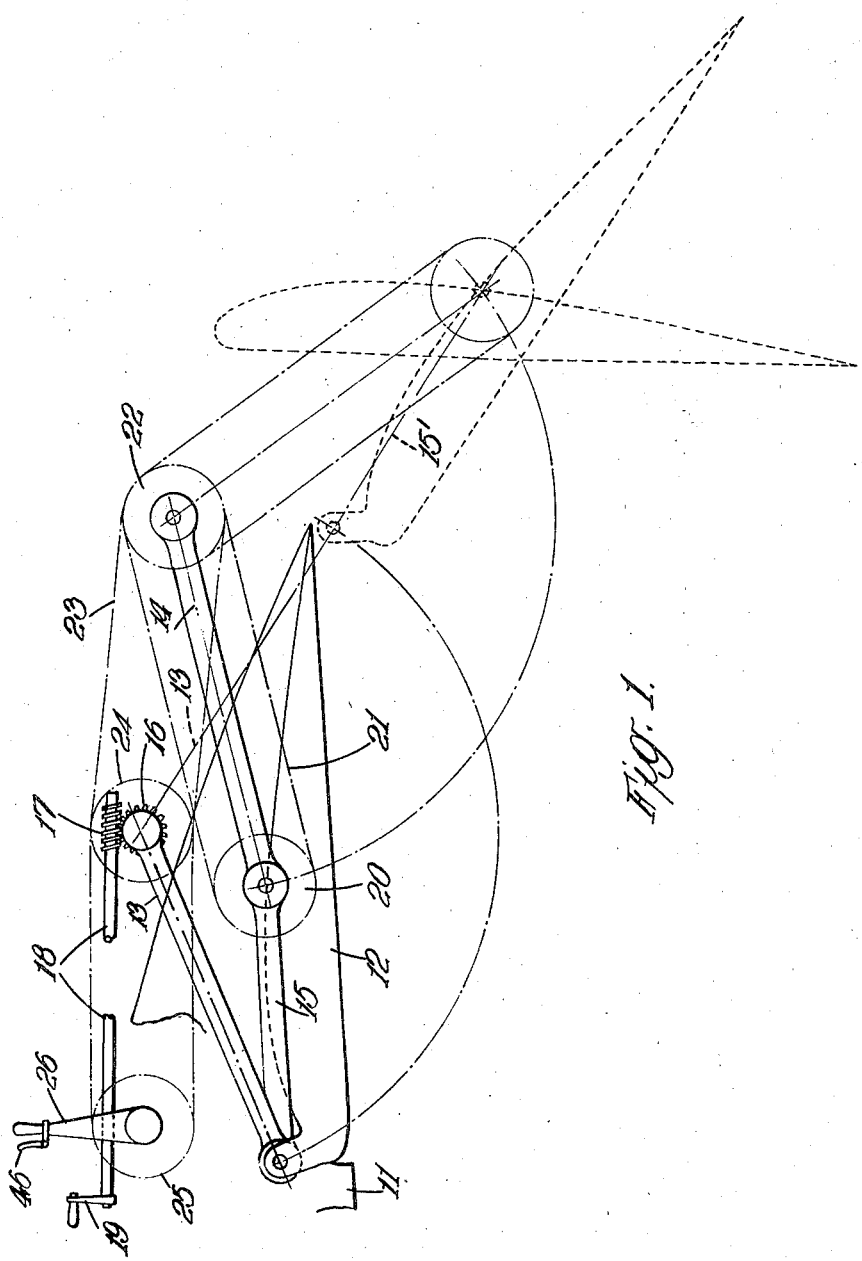

Aug. 12, 1941.   R. T. YOUNGMAN   2,252,656
FLAP FOR AIRFOILS
Filed July 25, 1938   3 Sheets-Sheet 1

INVENTOR
ROBERT TALBOT YOUNGMAN
BY
ATTORNEYS

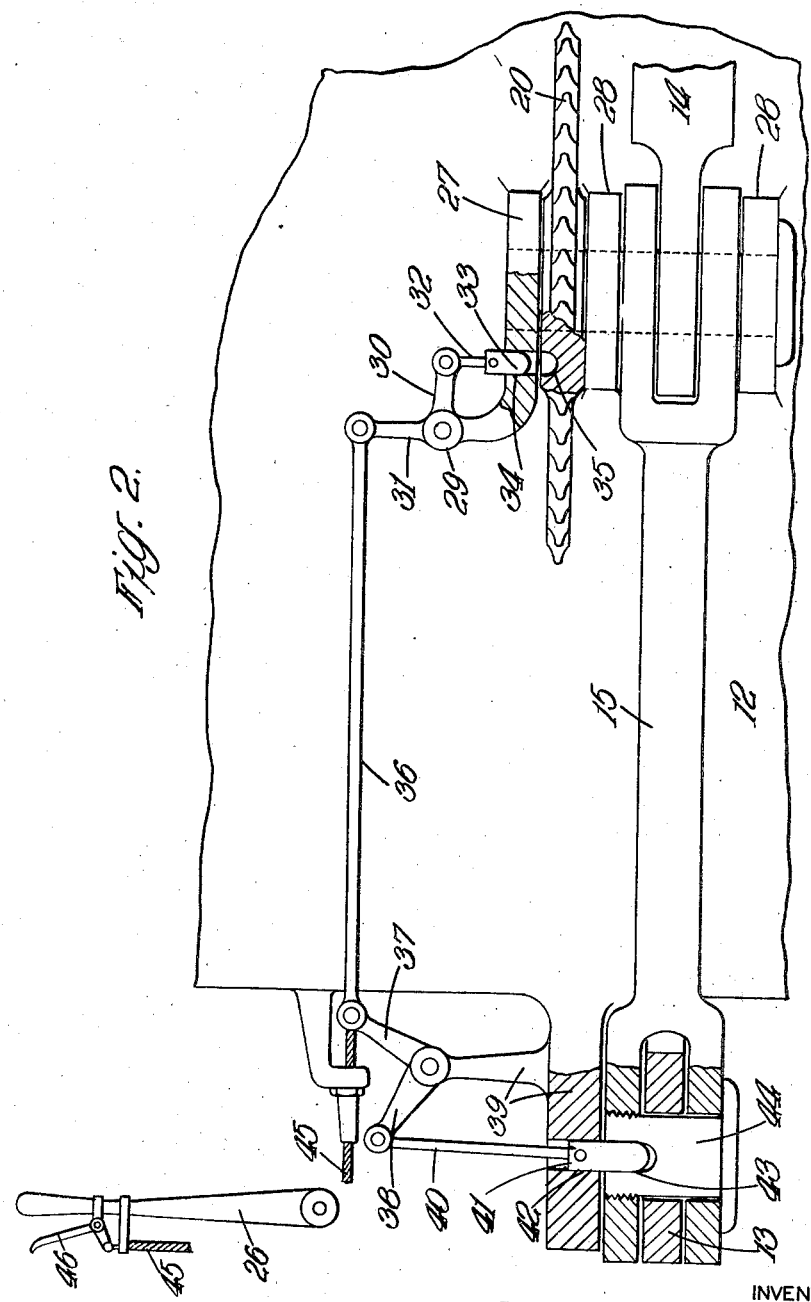

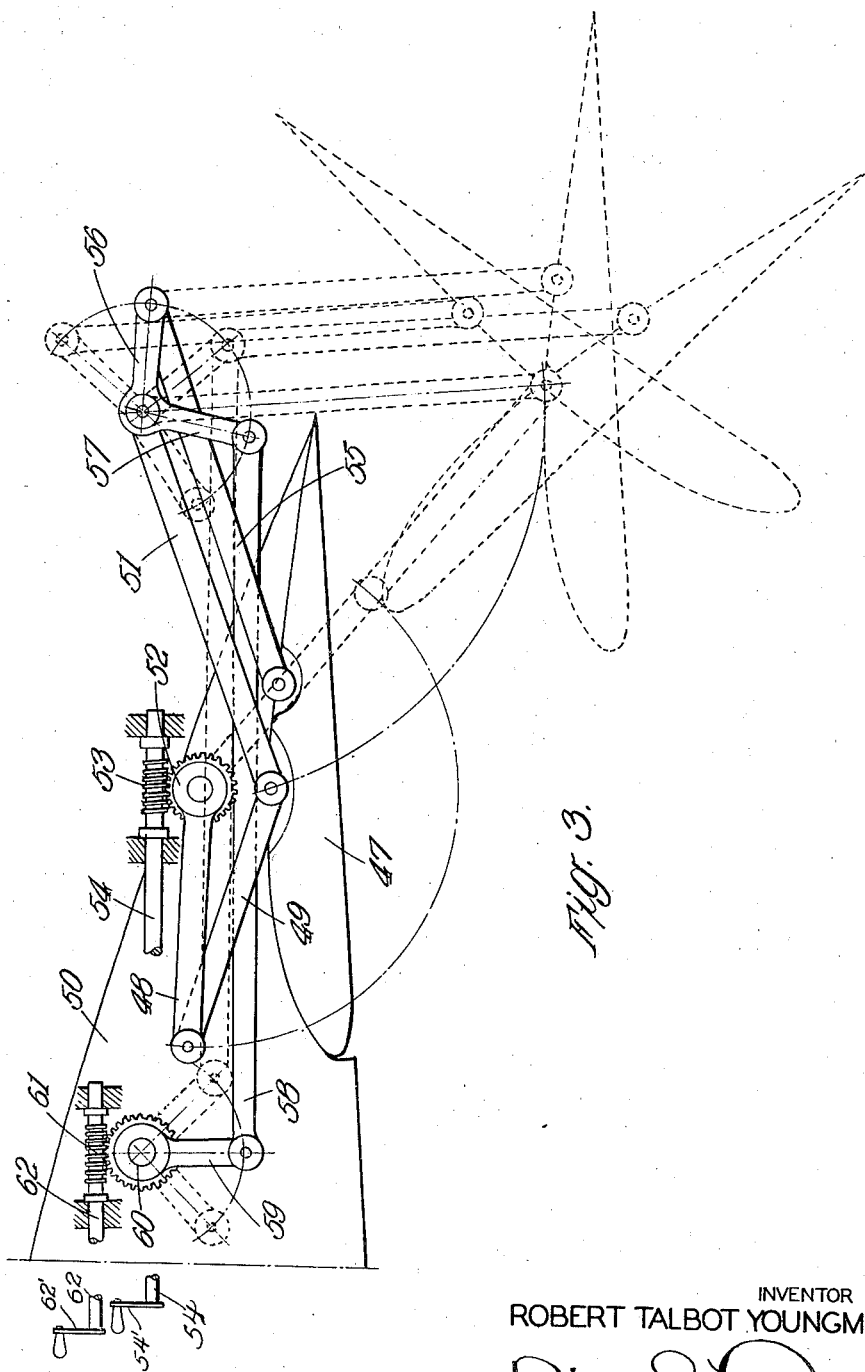

Patented Aug. 12, 1941

2,252,656

UNITED STATES PATENT OFFICE 2,252,656

FLAP FOR AIRFOILS

Robert Talbot Youngman, Church Crookham, Aldershot, England, assignor to The Fairey Aviation Company Limited, Hayes, Middlesex, England Application July 25, 1938, Serial No. 221,227
In Great Britain August 19, 1937

2 Claims. (Cl. 244—42)

The high speed of modern aircraft is achieved largely by increasing the wing loading of a main airfoil and it is well known that aircraft having a high wing loading require long "take off" and landing runs.

It is necessary in order to reduce the run required to increase the normal lift and drag of a main airfoil, and for this purpose trailing edge flaps and the like have been proposed. It is highly desirable, however, that the drag should be increased beyond the value obtaining when the flap has been moved to the position giving maximum lift so that the angle of glide may be steepened without consequent increase in the speed of the aircraft.

Depression of the trailing edge of a flap or winglet (by which is meant an auxiliary airfoil positioned near the trailing edge of a main airfoil, but with its leading edge somewhat in rear of said trailing edge) increases the lift of the main airfoil progressively until the flap or winglet is at an angle of approximately 50° to the chord of the main airfoil, at which position the lift has reached a maximum value. It has been found, however, that if the trailing edge of the flap or winglet be still further depressed the lift remains substantially constant, but the drag increases whilst if, instead of the trailing edge, the leading edge of the flap or winglet be depressed considerably, a large increase in drag also results.

It is the object of the present invention to provide improved means, readily operable by the pilot of the aircraft, for increasing the drag upon the airfoil whilst maintaining conditions of maximum lift and also to provide high drag without increase in pitching moment.

According to the invention, a flap or winglet for an aircraft is arranged to be lowered bodily below the level of a main airfoil, and, to be turned about an axis at or near to the centre of pressure to depress or raise the leading edge of the flap until the plane of the latter is substantially normal to that of the main airfoil.

The invention will now be described by way of example with reference to the accompanying drawings, of which Figure 1 is a fragmentary diagrammatic side elevation of a main airfoil and flap assembly in accordance with one form of the invention, Figure 2 is a fragmentary sectional plan view of the flap and associated operating mechanism to a larger scale, and Figure 3 is a similar view to Figure 1 showing a modified form of the invention.

Referring to Figures 1 and 2, 11 indicates the main airfoil and 12 a flap carried by a pair of links 13, 14 in the manner described in the specification of my co-pending application Serial Number 113,658, but the pivotal connections of the links 13, 14 and their lengths are such that, when the flap 12 is in its lowered position, its trailing edge lies below and in rear of the trailing edge of the main airfoil 11. The lower ends of the links 13, 14 are pivotally connected by a subsidiary link 15 which may normally lie within the flap 12. The upper end of the forward link 13 is rotatable as one with a worm wheel 16 meshing with a worm 17 fast on a shaft 18. The shaft 18 may be rotated from a crank handle 19 in the cockpit of the aircraft to cause lowering or raising of the flap 12, and the arrangement is such that when the flap 12 is lowered to the position of maximum lift, the forward (or shorter) link 13 and the subsidiary link 15 lie in a straight line, as indicated diagrammatically at 13', 15'.

In this way a triangulated structure is obtained between the shorter link 13 and the subsidiary link 15 (forming together one side), the longer link 14, and that portion of the main airfoil 11, or a part mounted thereon, between the upper ends of the shorter and longer links 13, 14. The flap 12 is thus firmly held in position.

The flap 12 is rotatable about the lower pivot point of the rear (or longer) link 14 and the forward part of the flap 12 is detachably connected with the lower pivot of the front (or shorter) link 13 as will be more fully described hereinafter.

Coaxially with the lower pivotal point of the rear (or longer) link 14, there is mounted, a sprocket wheel 20 connected by a chain 21 with a second sprocket wheel 22 freely rotatable about the upper pivotal axis of said link 14. A third sprocket wheel, coaxial with and fixed relatively to the sprocket wheel 22, is connected by a chain 23 with a fourth sprocket wheel 24 freely rotatable about the upper pivotal axis of the forward (or shorter) link 13. Said fourth sprocket is rotatable as one with a fifth sprocket which is connected to a sixth sprocket 25 movable as one with an operating lever 26 (for the sake of clearness shown in elevation and not in plan in Figure 2) in the pilot's cockpit.

The sprocket wheel 20 is freely mounted relatively to the flap 12 but may be positively connected therewith through a clutch device which is interconnected with a similar clutch mechanism for detachably connecting the flap 12 with the lower pivot of the forward link 13.

As will be seen from Figure 2, brackets 27, 28, 28 are provided on the flap 12, the sprocket wheel 20 being freely mounted between the bracket 27 and one of the brackets 28. The bracket 27 is formed with a lateral extension 29 on which a bell crank lever 30, 31 is pivoted. One arm 30 of this bell crank lever is pivoted to a rod 32 and to the other end of said rod 32 there is pivoted a plunger 33 which can be moved, when the flap 12 is in the stowed position, through an aperture 34 formed in the bracket 27 into a recess 35 formed in the face of the sprocket wheel 20. The arm 31 of the bell crank lever 30, 31 is connected by a link 36 with one arm 37 of a further bell crank lever 37, 38, pivoted on a bracket 39 carried by the forward part of the flap 12. The arm 38 of this bell crank lever is pivoted to a rod 40 connected with a plunger 41 which can be moved, when the flap 12 is in the stowed position, through an aperture 42 formed in the bracket 39 into a recess 43 formed in the pivot 44 of the links 13 and 15.

A Bowden cable 45 is connected between one end of the link 36 and a subsidiary control member 46 mounted on the operating lever 26.

The arrangement is such that normally the plunger 41 extends through the aperture 42 and into the recess 43 so that the leading edge of the flap 12 is positively connected with the pivot of the links 13 and 15, whilst the plunger 33 is withdrawn from the recess 35 so that the flap 12 is free to rotate about the pivotal axis of the links 14 and 15 as it is lowered.

In use, the flap 12 is lowered by rotating the crank handle 19 and, owing to the relative lengths of the links 13 and 14 the bodily lowering of the flap 12 is accompanied by a turning movement about the pivotal axis of the links 14 and 15. When the flap 12 has been fully lowered the pilot may grasp the lever 26 and the control member 46 to free the flap 12 from the pivot of the links 13 and 15 and, simultaneously, to connect the flap 12 with the sprocket wheel 20. By rocking the lever 26 the flap 12 may now be turned, about the pivotal axis of the links 14 and 15, to depress or raise its leading edge until its plane is substantially normal to that of the main airfoil 11.

In a modified form of the invention, and as shown in Figure 3, the flap 47 is carried, on the one hand, by a two part link 48, 49, the part 48 being pivoted to the main airfoil 50 and the part 49 being pivoted to the flap 47 at or near its centre of pressure, and, on the other hand by a link 51 pivoted, at one end, to the flap coaxially with the part 49 and, at the other end, to a part carried by the main airfoil 50. That end of the part 48 of the two part link which is pivoted to the main airfoil 50 carries a worm wheel 52 meshing with a worm 53 which may be rotated through a shaft 54 from means, such as a crank handle 54', in the cockpit of the aircraft.

In rear of the pivotal connection of the link 51 and the part 49, there is pivoted one end of a link 55, the other end of which is pivoted to one arm 56 of a bell crank lever 56, 57 mounted coaxially with the upper end of the link 51. The arm 57 of the bell crank lever is connected by a link 58 with an arm 59 rotatable as one with a worm wheel 60 meshing with a worm 61 which may be rotated through a shaft 62 by subsidiary means, such as a crank handle 62', in the cockpit of the aircraft.

If desired, the two part link 48, 49 may be replaced by an hydraulic jack one part of which is pivoted to the airfoil 50 and the other part of which is pivoted to the flap 47.

In use, the flap 47 is first lowered bodily by operation of the worm 53 and is then turned about its axis by operation of the worm 61 so that its leading edge is raised or lowered as may be desired. It will be appreciated that by suitable operation of the worm 61 the flap 47 may be positioned to suit the various evolutions of the aircraft such as "take off," landing, and dive-bombing.

In particular, the invention enables the leading edge of the flap to be raised or depressed even until the general plane of the flap is normal to that of the airfoil and according to the degree of movement remarkable results are obtainable in the control of aircraft having flaps arranged in accordance with the invention.

It is to be understood that a plurality of mechanisms as described above may be provided for each flap or in some cases a plurality of the first mentioned and two-part links may be provided in conjunction with a single mechanism for turning a flap about its axis.

In dive bombing, it is a great advantage to increase the drag without increase in lift or pitching moment, and it has been found that depression of the nose of the flap or winglet to give a negative incidence relative to the main wing, increases the drag without such a large increase in lift as when the trailing edge is depressed, and also the pitching moment of the combined wing and flap is considerably less.

The term "flap" used in this specification is intended to include a winglet of a main airfoil.

I claim:

1. In an airplane wing, a flap, and means mounting said flap for movement between an upper, retracted position and lower, extended positions, comprising first pivot means on said flap, second pivot means on said flap to the rear of said first pivot means, a crank arm, axle means mounting said crank arm on said wing for rotation about a fixed axis to the rear of said pivot means when said flap is retracted, a link having one end pivoted on said first pivot means and the other end pivoted to said axle means, a second link having one end pivoted to said second pivot means and its other end pivoted to the free end of said crank arm, extensible means mounted on said wing and connected to said first pivot means to rock the same about said axle means whereby to swing said flap between retracted and extended positions, and driving means operable independently of said extensible means for swinging said crank arm about said axle means whereby to rotate said flap about said first pivot means.

2. The combination claimed in claim 1, said extensible means comprising a shaft rotatably mounted in said wing, a second crank arm on said shaft, a third link having one end pivoted to the free end of said crank arm and the other end pivoted to said first pivot means, and one-way drive means connected to said second crank arm for rotating the same about said shaft.

ROBERT TALBOT YOUNGMAN.